United States Patent [19]
Chen et al.

[11] Patent Number: 5,568,603
[45] Date of Patent: Oct. 22, 1996

[54] METHOD AND SYSTEM FOR TRANSPARENT MODE SWITCHING BETWEEN TWO DIFFERENT INTERFACES

[75] Inventors: Michael Chen, Palo Alto; Richard I. Mander, Menlo Park; Ian S. Small, Cupertino, all of Calif.

[73] Assignee: Apple Computer, Inc., Cupertino, Calif.

[21] Appl. No.: 289,274

[22] Filed: Aug. 11, 1994

[51] Int. Cl.⁶ .................................................. G06F 3/14
[52] U.S. Cl. ............................................................ 395/155
[58] Field of Search ................................... 395/156, 157, 395/159, 155; 345/7, 123

[56] References Cited

U.S. PATENT DOCUMENTS

| | | | |
|---|---|---|---|
| 5,182,796 | 1/1993 | Shibayama et al. | 395/156 |
| 5,311,203 | 5/1994 | Norton | 345/7 |
| 5,384,579 | 1/1995 | Nakasuji et al. | 345/123 |

Primary Examiner—Mark R. Powell
Assistant Examiner—Ruay Lian Ho
Attorney, Agent, or Firm—Burns, Doane, Swecker & Mathis

[57] ABSTRACT

A method and apparatus for transparently switching between viewing modes in a computer system is described. The method and apparatus of the present invention includes a bounding area and a smaller reference region within that bounding area. The bounding area is typically a computer display screen or a window within that screen. The reference region is an implicitly or explicitly defined boundary within the bounding region. The system and method allows for automatic switching between two viewing techniques within the bounding area, based on the location of the cursor location relative to the defined reference region and bounding area. Switching between viewing modes occurs when the cursor passes across the reference region whether the mouse button is up or down. This allows the user to easily change between viewing methods without having to take explicit steps to switch between the two modes by making a selection from a selection palette or keyboard to initiate the switch.

36 Claims, 4 Drawing Sheets

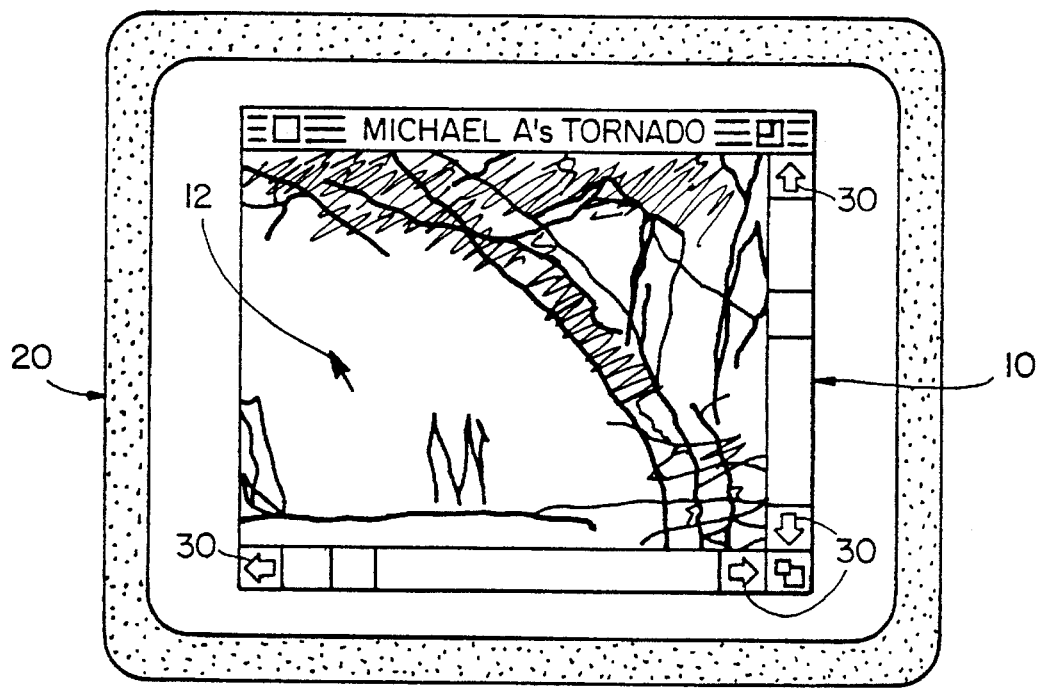
FIG_1
(PRIOR ART)
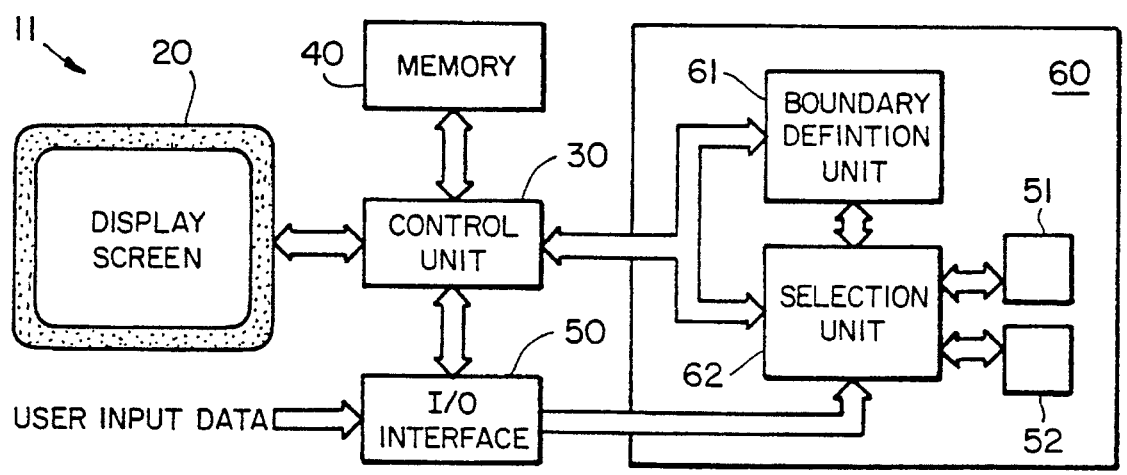
FIG_2

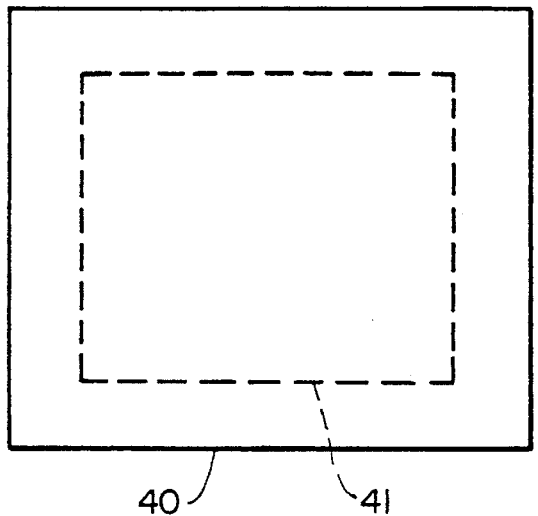
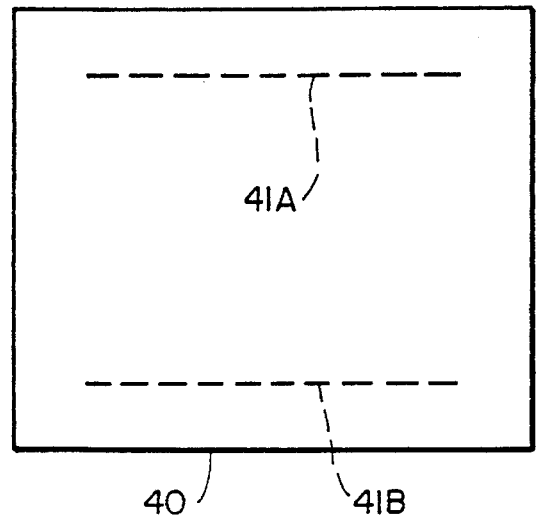
FIG_3A  FIG_3B
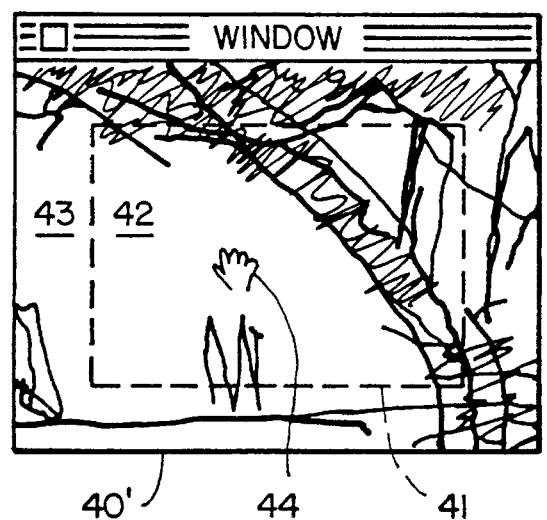
FIG_4

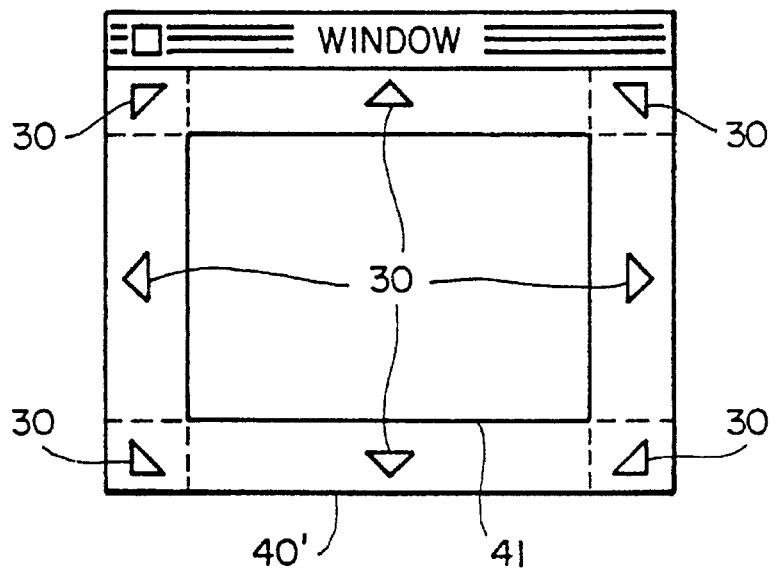
FIG_5A
| CURRENT ARROW CURSOR | CURSOR HIGHLIGHTED STATE | SCROLL ACTION |
|---|---|---|
| ◁ | ◀ | SCROLL TO THE LEFT |
| ▷ | ▶ | SCROLL TO THE RIGHT |
| △ | ▲ | SCROLL UP |
| ▽ | ▼ | SCROLL DOWN |
| ◸ | ◤ | SCROLL UP AND TO THE LEFT |
| ◹ | ◥ | SCROLL UP AND TO THE RIGHT |
| ◺ | ◣ | SCROLL DOWN AND TO THE LEFT |
| ◿ | ◢ | SCROLL DOWN AND TO THE RIGHT |
FIG_5B

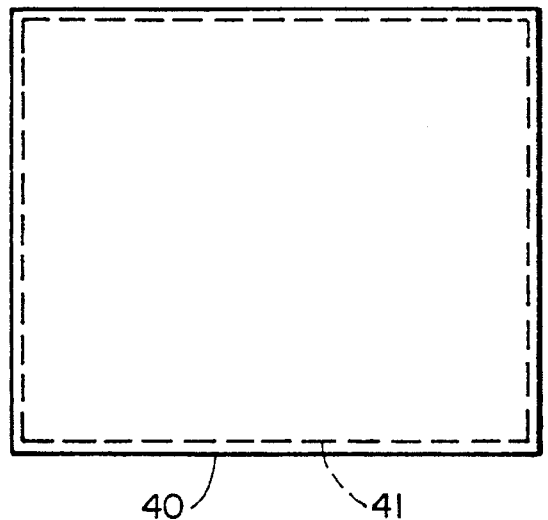
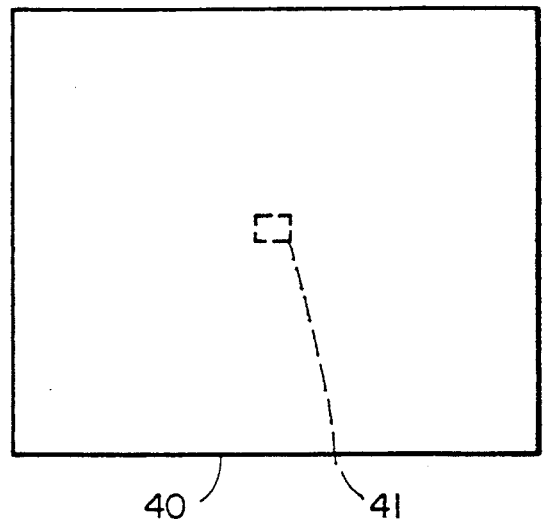
FIG_6A   FIG_6B
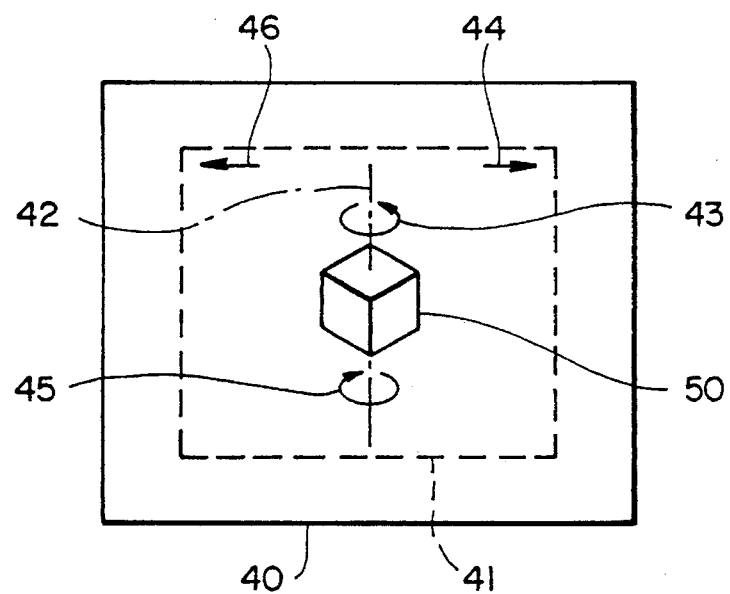
FIG_7

METHOD AND SYSTEM FOR TRANSPARENT MODE SWITCHING BETWEEN TWO DIFFERENT INTERFACES

FIELD OF THE INVENTION

The present invention relates to a technique for viewing data in computer display screens and windows.

BACKGROUND OF THE INVENTION

In a computer system, a display screen is utilized for viewing data that the system user is currently interacting with. The data may comprise graphical data (e.g. a picture of an object) or textual data (e.g. a document). The picture is typically viewed within an area defined within the screen, referred to as a window. The window may be as large as the screen or may be made smaller depending on the particular needs of the user. FIG. 1 illustrates a typical window 10 within a display screen 20. Most times, all of the data will not fit within the window or screen. As a result, only a portion of the data can be viewed by the user at one time. In order for the user to be able to display other portions of the data, the view of the picture in the window needs to be changed. To change a user's view the picture must be manipulated in some way by the user. There are two common view changing methods: the position controlled method and the rate controlled method.

An example of a position controlled method for changing views of a picture is seen in many graphical programs. This type of method commonly employs a "grabber" tool which may be selected from a menu of tools. The menu of tools is typically displayed on the side of the window. Once the "grabber" tool is selected, a "grabber" tool cursor, (sometimes in the shape of a hand), is displayed on the screen. The computer system's input/output (I/O) interface (e.g. a mouse) controls the movement of the cursor within the screen and also allows the user to interact with the data on the screen. When the I/O interface is deactivated, (e.g. when the mouse button is up), the I/O interface only controls the movement of the cursor within the screen. When the I/O interface is activated, (e.g. when the mouse button is down) the user is able to directly interact with the data on the screen.

View changing with the "grabber" tool is achieved by holding down the mouse button (i.e. activating the I/O interface) while dragging the mouse in an arbitrary direction and then releasing the button (i.e. deactivating the I/O interface); leaving the cursor in a new position on the screen. These actions cause the cursor to effectively "grab" onto the picture and scroll it in the direction of the mouse movement.

A rate controlled view changing method employs scroll arrows 30 located at the border of a window 10 (refer to FIG. 1). By positioning cursor 12 on any of the arrows 30 and holding the mouse button down, the view will continuously move in the direction of the arrow. For instance holding the right scroll arrow down, will move the view (not the picture) continuously to the right, effectively scrolling the picture to the left. The rate of scrolling is fixed by the application program of which the scrolling tool is within. Note that the view can only be scrolled in four directions—up, down, left, and right. For example, it is not possible to move the picture diagonally as with the "grabber" tool.

The "grabber" tool and the scroll tool provide two distinct styles of view changing. The "grabber" tool is characterized as a positional controller because the change in the cursor position controls the change in position of the picture being viewed. Usually, there is a one-to-one mapping so that the picture is moved the same amount as the cursor movement. This effectively gives the impression that the user can "grab" onto the picture and slide it within the window directly. Thus, the grabber tool is desirable because it allows the user to have a localized fine scrolling control by being able to move the picture with the cursor. The grabber tool is less effective when scrolling large distances, since the user would have to typically do multiple "strokes" with the mouse to cover the distance.

The scrolling tool, on the other hand, is useful in that once the mouse button is depressed over a scroll arrow, the picture begins to scroll at a fixed rate. The picture continues to scroll while the mouse button is held down. Thus, the scroll option is desirable because it allows continuous scrolling without the effort of doing multiple "strokes" with the mouse, unlike the "grabber" tool. However, since the scroll steps are typically fixed, it is usually not possible to have the fine tuning control such as that of the "grabber" tool. In general, the "grabber" tool provides a finer localized control whereas the scroll tool provides a faster but coarser control. Both types of controllers offer their own unique and useful manner in which to change views of the picture within a window.

The manners in which the scrolling and grabber tools are selected are distinctly different too. The scroll tool is typically available at all times when the window is open. As shown in FIG. 1, the scrolling arrows are always displayed while the user is manipulating the picture. As long as the mouse pointer is moved over a scroll arrow, it can be clicked to perform scrolling. The grabber tool on the other hand needs to be initially selected from a palette of tools typically located along the side or top of the window. In other words, the user must consciously select the grabber tool in order to use it. To do this the user must take two additional steps: 1) move the mouse to the grabber tool select button on the palette and 2) depress the mouse button. The user must interrupt current ongoing screen interaction to do this.

What would be desirable is a way to give the user the ability to switch between two different viewing methods without having to interrupt picture manipulation activity. In this way the user would be given increased viewing flexibility.

SUMMARY OF THE INVENTION

The present invention is a method and system for transparently switching between two different viewing tools. In the preferred embodiment, the present invention is utilized to switch transparently between a position controlled tool and a rate controlled tool.

The method of the present invention includes defining an area within a display screen in which data is viewed, referred to as a bounding area. Within the bounding area a reference region is defined. The reference region functions as a boundary within the bounding area. In the preferred embodiment, the reference region is an enclosed, non-visible rectilinear boundary that is smaller than or the same size as the bounding area. In one embodiment of the present invention, the size of the reference region is adjustable. Other embodiments of the present invention include different shaped enclosed or open-ended boundaries that may or may not be visible to the viewer.

In the preferred embodiment, the bounding area is contiguous with a window displayed within a computer display screen and the reference region is an implicitly defined rectilinear shape having two sides: an inside area and an outside area. When the cursor is in the inside area of the reference region, picture viewing is controlled by a first viewing tool. When the cursor is in the outside area of the reference region (but within the bounding region), picture viewing is controlled by a second viewing tool. Switching between one viewing tool to another occurs when the cursor passes over the reference region while moving from one side to the other. Switching occurs independent of whether the I/O interface is activated or not (i.e. whether the mouse button is depressed or not depressed).

In the preferred embodiment, when the cursor is in the inside area of the reference region, picture viewing is controlled by a position controlling tool and when the cursor is in the outside area of the reference region, picture viewing is controlled by a rate controlling tool. In this embodiment, when the cursor moves to the outside area of the reference region, the cursor becomes one of eight directional scrolling arrows that are displayed giving the user a choice of selecting which direction the picture is to be scrolled, right/left, up/down, or diagonally.

Another aspect of the present invention is that the direction in which the picture scrolls in the scroll mode is opposite that of conventional scrolling techniques. That is, when a particular scroll arrow is depressed, the picture moves in the direction indicated by the arrow. For instance, if the right scroll arrow is depressed, the picture moves to the right. This gives the user an appearance of continuity in the direction in which the picture is moving when the cursor passes over the reference region and switches from one viewing tool to the other.

BRIEF DESCRIPTION OF THE DRAWINGS

FIG. 1 illustrates a typical window within a display screen.

FIG. 2 illustrates a block diagram of the system of the present invention connect to a basic computer system configuration.

FIG. 3A illustrates a first embodiment of the bounding area and the reference region of the present invention.

FIG. 3B illustrates a second embodiment of the reference region and bounding area of the present invention.

FIG. 4 illustrates a third embodiment of the present invention in which a window is the bounding area.

FIG. 5A illustrates eight cursor arrows which are displayed in one embodiment of the present invention when the cursor is on the outside of the reference region.

FIG. 5B is a table which illustrates cursor arrow in a highlighted and non-highlighted state and corresponding scrolling directions.

FIG. 6A illustrates an embodiment of the present invention in which the reference region has been enlarged such that it is approximately the same size as the bounding area.

FIG. 6B illustrates an embodiment of the present invention in which the reference region has been shrunk to a very small area within the bounding area.

FIG. 7 illustrates a three-dimensional embodiment of the present invention.

DETAILED DESCRIPTION

A method and system for transparently switching between different data manipulation tools in a computer screen or window is described. In the following description, numerous specific details are set forth, such as different types of data manipulation tools, specific types of I/O interfaces, manners in which the present invention is displayed on the computer screen, etc., in order to provide a thorough understanding of the present invention. It will be obvious, however, to one skilled in the art that these specific details need not be employed to practice the present invention. In other instances, well-known computer system architectures have not been described in detail in order to avoid unnecessarily obscuring the present invention.

FIG. 2 illustrates a basic computer system 11 having a display screen 20, control unit 30, memory 40, and input/output (I/O) interface 50. System 11 also includes the system of the present invention 60 including boundary definition unit 61 and data manipulation tool selection unit 62 of the system of the present invention along with data manipulation tool units 51 and 52.

Display screen 20 allows the computer system user to view data that is stored in memory 40. The data may be graphical (e.g. a picture) or textual (e.g. a document) or a combination of the two. I/O interface 50 allows the user to interact with the data displayed on the screen. Control unit 30, (which includes elements such as a central processing unit (CPU) and an arithmetic unit, etc.), functions to interpret instructions and data that is communicated by the user through the I/O interface (or from memory 40) to control the data displayed on the screen in a manner intended by the user.

A variety of different types of I/O interfaces 50 may be employed. Commonly used interfaces include a mouse, a keyboard, a joystick, a pen-type device, or a touch pad. The I/O interface commonly has an associated movement indicator, referred to as a cursor, displayed on the screen (indicated by 12, in FIG. 1 ). The I/O interface controls the movement of the cursor about the screen. The manner in which the user moves the cursor on the screen depends on the type of I/O interface used. For instance, when a mouse-type interface is physically slid across a flat surface the cursor moves in a similar manner. A keyboard, on the other hand, requires directional buttons to move the cursor.

In most cases, in order for the I/O interface to cause any changes in the data displayed on the screen, the user must activate the I/O interface in some manner. For instance, in the case of a mouse, when the mouse activation button is up (i.e. not depressed) the only effect of moving the mouse is to move the cursor on the screen. In other words, the user is not able to directly interact with the data. However, when the mouse button is depressed, the user may interact with the data displayed on the screen.

Users may choose to manipulate the data in a variety of different manners. The fashion in which the user interacts with the data depends on the data manipulation tool being used. Basically, a data manipulation tool is a set of stored instructions that tell control unit 30 how the displayed data is to be manipulated. FIG. 2, shows two data manipulation tool units 51 and 52. It should be noted that although only two data manipulation tools are shown, more may be employed.

The system of the present invention also includes boundary definition unit 61, (FIG. 2). Unit 61 functions to define a bounding area 40 (FIG. 3A) and a reference region 41 (FIG. 3A) within the display screen. Bounding area 40 is defined as the area in which data is displayed, while reference region 41 is a boundary defined within bounding area 40. FIG. 3A shows the preferred embodiment of reference region 41, i.e. a closed rectilinear boundary. FIG. 3B illustrates another embodiment of the present invention in which the reference region is not closed. As shown in FIG. 3B, the reference region is defined by two lines 41A and 41B. The main purpose of the reference region is to establish a boundary within bounding area 40. It should be noted that bounding area 40 may be contiguous with the display screen or smaller.

In one embodiment, the bounding area is contiguous with a window displayed within the screen. FIG. 4 illustrates a typical window having bounding area 40' and reference region 41 (dashed line). FIG. 4 also shows movement indicator 44, i.e. the cursor. It should be noted that although the reference region is explicitly shown as a dashed line in FIG. 4, in the preferred embodiment, the reference region is not explicitly displayed, but is implicitly defined.

In general, the manner in which the system of the present invention functions is that when movement indicator 44 is within reference region 41 (i.e. area 42), selection unit 62 (FIG. 2) causes a first data manipulation tool to control the manner in which the data is manipulated on the screen. When movement indicator 44 is in the region between reference region 41 and bounding area 40', (i.e. area 43 FIG. 4), selection unit 62 (FIG. 2) causes data manipulation to be controlled by a second data manipulation tool. Moreover, when the cursor passes from one side of reference region 41 to the other, tool switching occurs. All the above conditions are true whether the I/O interface is activated or not, (e.g. whether the mouse button is up or down).

In one embodiment of the present invention the types of data manipulation tools utilized are viewing tools. A viewing tool is commonly employed by the user to change the view of the data displayed on the screen, particularly if all of the data cannot be displayed within the screen at once. Commonly, the data being viewed is in graphical form (e.g. a picture of an object)—although, the present invention is not limited to graphical data. In the preferred embodiment of the present invention two viewing tools are utilized, a "grabber" tool and a scrolling tool, to view a picture within a window.

The following description of the present invention relates to the preferred embodiment of the present invention. Specifically, this embodiment employs the grabber and scroll tools to view graphical data, i.e. a picture of an object. Further, in this embodiment, the bounding area is contiguous with a window displayed within the screen. In addition, this embodiment assumes that the I/O interface is a mouse.

There are several different conditions that can occur when interacting with the method and system of the present invention in this embodiment. Most of these conditions are dependent on 1) whether the I/O interface is activated or not (i.e. the mouse button is up or down), 2) whether the cursor is inside or outside of the reference region, or 3) whether the cursor is passing over the reference region. Table 1 outlines the four possible conditions that can occur.

TABLE 1

| condition | mouse state | cursor position | tool mode | displayed on screen |
| --- | --- | --- | --- | --- |
| I | up or down | inside region 41 | grabber | "grabber" tool cursor |
| II | up or down | outside region 41, but inside bounding area 40 | scroll | cursor becomes one of eight possible arrows |
| III | up | passing across region 41 in either direction | switched between modes | display depends on whether cursor is inside or outside of region 41 |
| IV | down | passing across region 41 in ehher direction | switched between modes | see Table 2 |

In condition I, the mouse button is either up or down and the cursor is on the inside of reference region 41. In this state, in the preferred embodiment, the cursor is displayed as the "grabber" tool cursor. In one embodiment of the present invention, the "grabber" tool cursor is in the shape of a hand, (as illustrated in FIG. 4). If the mouse button is depressed while inside the reference region at this time, the "grabber" tool technique is automatically initiated.

In the case of condition II, the mouse button is either up or down and the cursor is outside of reference region 41, but within bounding area 40'. As a result, the scroll tool unit causes the cursor to become one of eight possible arrows depending on the cursor's location, (FIG. 5A illustrates the eight possible cursor arrows 30). As an example, if the user moves the mouse to a specific location outside of reference region 41, one of eight possible cursor arrows shown in FIG. 5A is displayed. If the mouse button is depressed at this time, that particular cursor arrow is highlighted and the picture scrolls at a fixed rate in the direction designated by the arrow. FIG. 5B is a table showing the highlight state and direction of scrolling for each cursor arrow.

It should be noted that in another embodiment of the present invention all eight of scroll arrows 30 (FIG. 5A) may be displayed (but not highlighted) at the same time once the mouse passes across the reference region to allow the user to see the possible choices of scrolling directions.

Referring to Table 1, Condition III is the case in which the cursor passes from one side to the other of the reference region while the mouse button is up. In this case, selection unit 62 (FIG. 2) causes the viewing modes to be automatically switched. In the case of the preferred embodiment, the viewing mode switches between the scrolling tool mode and the "grabber" tool mode. It should be noted that the view of the picture remains unaffected, since the mouse button is not depressed—viewing modes are only activated once the mouse button is down. Instead, the action of moving between modes while the mouse button is up causes each viewing tool to display the specific indicators that are unique to each mode. For instance, in the preferred embodiment, when the cursor moves to the inside of region 41, "grabber" tool cursor 44 (FIG. 4) is displayed. Further, when the cursor moves to the outside of region 41, one of eight cursor arrows 30 (FIG. 5A) is displayed.

Selection unit 62 also automatically switches modes in Condition IV. The sequence of events that occur during a specific case of Condition IV is described in Table 2. An indicated in Table 1, Condition IV is the case in which the cursor passes over the reference region in either direction, while the mouse button is depressed. Table 2 describes the specific sequence of events that occur when passing left to right from the inside to the outside of reference region 41. It should be obvious that similar steps occur when passing in other directions between viewing modes when the mouse button is depressed.

embodiment, this would mean that the scrolling tool mode would control view changing.

In another embodiment of the present invention, instead of the picture being viewed in a two-dimensional manner (i.e. in the x–y plane), the picture may be viewed three-

TABLE 2

| Stop | User Action | Computer Action |
|---|---|---|
| 1 | Cursor inside reference region, mouse button is down | Grabber tool "cursor" displayed |
| 2 | Cursor is moving fight within the reference region with button still down | Picture is being scrolled to the right using grabber interface |
| 3 | Mouse cursor moves outside reference region (button still down) | Mode is automatically switched to scroll arrow |
| 4 | Mouse cursor remains outside reference region (button still down) | Picture continues to scroll to the right using scroll arrow interface while the pointer is outside of the reference region |

In step 1, as indicated in Table 2, the cursor is in the inside of the reference region and the button is down. In this state, the "grabber" tool mode controls the movement of the object in the screen. Step 2 indicates that the cursor is moving to the "right" (within the reference region) while the mouse button is down thereby causing the picture to be scrolled to the right as dictated by the "grabber" tool mode. When the cursor passes to the outside of reference region 41 while the mouse button is down, selection unit 62 (FIG. 2) changes the viewing mode to the scroll tool mode (step 3). Once on the outside of the reference region (step 4), the picture continues to scroll to the right in a manner dictated by the scroll tool mode.

It should be noted that the direction of scroll cursor arrows 30 and the direction in which the picture scrolls is different from prior art scrolling techniques. For instance, in prior art scrolling techniques, when the right scroll arrow is depressed, the picture is scrolled to the left, while the view is scrolled to the right. However, in the method and system of the present invention the picture scrolls to the right while the view scrolls to the left when the right cursor arrow is depressed. Thus, for the present invention, the cursor arrow indicates the picture's scrolling direction instead of the view's scrolling direction. This aspect of the present invention is to facilitate continuity of scrolling direction of the picture so that, even though the sequence of events causes a mode switch, there is still a strong correspondence between the scrolling action before and after—namely the picture is scrolled right as the cursor is dragged to the right across the reference region. If conventional prior art scrolling directions were used with the method and system of the present invention, the picture would abruptly begin scrolling in the opposite direction once the cursor passed over the reference region boundary.

Another aspect of the present invention is that the size of reference region 41 may be adjusted by the user. For example, the reference region may be expanded to the size of bounding area 40 (as shown in FIG. 6A). In doing this, the view changing mode on the outside of the reference region is eliminated and the area inside the reference region is expanded. As a result, view changing is solely controlled by the specific "inside" mode. In the preferred embodiment in which the "grabber" tool is the "inside" tool, the picture is controlled by the "grabber" tool. Conversely, the reference region may also be reduced in size (as shown in FIG. 6B). If this is the case, the inside area is reduced and the outside area is expanded. Consequently, the picture is solely controlled by the outside view changing mode. For the preferred dimensionally. FIG. 7 illustrates the direction of the cursor and the corresponding movement of the picture in the three-dimensional embodiment of the present invention. As can be seen in FIG. 7, when the cursor is inside reference region 41 and is moved to the right—while the mouse button is down—the object in the bounding area is rotated to the right about axis 42. Rotational path 43 indicates the movement of object 50 and path 44 indicates the direction of the cursor. Another example is that the object may be rotated in the direction as indicated by path 45, by moving the cursor in the direction indicated by the arrow 46, i.e. to the left. It should be obvious that the rotational directions shown in FIG. 7 are only examples and that when the cursor is within reference region 41, the object may be rotated in a given direction simply by moving the cursor in that direction.

When the cursor is moved outside of the reference region in the three-dimensional embodiment of the present invention, the viewing mode is switched to the scrolling tool mode. As with the two-dimensional embodiment, one of eight cursor arrows is displayed, depending on the location of the mouse. When the mouse button is depressed while one of the cursor arrows is displayed, the object on the screen rotates in the designated direction indicated by the arrow. For example, if the right cursor arrow is depressed, the object rotates to the right about axis 42 (FIG. 7), if the left cursor arrow is depressed, the object rotates to the left about axis 42.

It should be obvious that mode switching for the three-dimensional embodiment is the same as that of the two-dimensional embodiment. Specifically, viewing modes automatically change whenever the cursor passes from one side of the reference region to another, while the mouse button is up or down.

An alternative embodiment of the present invention applies to a computer system employing a pen-type I/O interface device. One manner in which the pen-type interlace is implemented in a computer display system is that when a pen tool is physically moved about the display screen a position indicator (e.g. a cursor) is displayed. This state of the pen-type interface is similar to the deactivated state of the mouse, i.e. when the mouse button is up and moving about the screen. To activate the pen-type interface in this implementation, either the pen tool is pressed against the screen or a button on the pen is depressed.

In this implementation of a pen-type I/O interface, the present invention would function in the same manner as described for the mouse I/O interface. Specifically, the action of dragging the pen tool about the screen in its deactivated state (i.e. not pressed against the screen or button up) causes each data manipulation tool to display the specific indicators that are unique to each mode—depending on the location of the pen tool on the screen with respect to the bounding area and the reference region. Activating the pen-type interface elicits the same response as activating the mouse, i.e. the particular data manipulation tool is initiated depending on the location of the pen tool on the screen with respect to the bounding area and the reference region.

In contrast to the pen-type interface implementation described above, another implementation of the pen-type interface does not display the cursor when the pen tool is dragged about the screen in its deactivated state. Instead, the computer system implicitly tracks the position of the pen tool. When applying this pen-type interface implementation to the present invention, the screen does not necessarily display the one of eight cursor arrows 30 (FIG. 5A) or grabber tool cursor 44 (FIG. 4) while the pen-type interface is activated or deactivated. However, tool switching still occurs independent of whether the pen-type interface is activated or not. For example, if the pen-type interface is activated while inside the reference region, a first tool is initiated and if the pen-type interface is activated while outside of reference region 40 a second tool is initiated. Further if the pen-type interface is activated while being dragged across the reference region, mode switching still occurs.

Still another implementation of the present invention applies to another type of I/O interface referred to as a touch pad I/O interface. Touch pad interfaces are similar to the pen-type interface except that instead of dragging a pen tool across the screen, the user drags a pen tool or a finger about a pad. Typically, there is a one-to-one position mapping between the screen and the position of the pen tool on the pad. In this instance, the boundary area and reference region may be defined on the pad itself with interchangeable transparency sheets. In addition, the sheets may also illustrate the cursor arrows 30.

Another embodiment of the present invention involves the manner in which the scrolling tool functions when the cursor is positioned outside of both reference region 41 and bounding area 40' (FIG. 5A). For example, if the cursor is outside of bounding region 40' and in-line with the right directional cursor arrow, and if also, the I/O interface is activated, the picture will scroll to the right. Thus, even though the cursor is not within bounding area 40', the scroll tool is still initiated. A variation of this embodiment is that as the cursor is dragged farther outside of and away from bounding area 40', the rate at which the picture is scrolled is increased. It should be obvious that the aspects provided by these particular embodiments apply to all of the scrolling directions provided by the scrolling tool.

Still another embodiment of the present invention relates to the scrolling angles that are available to the user when in the scrolling tool mode. FIG. 5A illustrates the embodiment of the present invention in which eight scrolling directions are available. In other words, assuming an x–y axis centered in the middle of reference region 41, this embodiment can scroll the picture at angles of 0°, 45°, 90°, 135°, 180°, 225°, 270°, and 315°, (i.e. angles that are multiples of 45°). A variation of the above described embodiment functions such that when the I/O interface is positioned in the zone outside of bounding area 40', while the I/O interface is activated, the picture can be scrolled at an arbitrary angle between 0°–360°. The angle, for example, may be based on the location of the cursor relative to the middle of reference region 41. In this embodiment, either the closest cursor arrow would be highlighted when the I/O interface is activated or no cursor arrows are highlighted.

Although the elements of the present invention have been described in conjunction with certain embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

We claim:

1. In a computer system including a screen for displaying data, an I/O interface for interacting with said data on said display screen when said I/O interface is activated, and a movement indicator displayed on said screen for showing the movement of said I/O interface, a system for switching between at least two data manipulation modes on said screen comprising:

a means for defining a bounding area in which a portion of said data is displayed;

said means also for defining a boundary defined within said bounding area;

a means for providing said at least two data manipulation modes;

a means for switching between said at least two data manipulation modes in response to the location of said movement indicator in relation to said bounding area and said boundary, wherein said switching means switches between said at least two data manipulation modes independent of whether said I/O interface is activated or deactivated.

2. The system as described in claim 1 wherein said boundary is a closed rectilinear shape having an inside and an outside.

3. The system as described in claim 2 wherein when said movement indicator is in said inside of said rectilinear shape said one of said at least two data manipulation modes is activated and when said movement indicator is on said outside of said rectilinear shape another of said at least two data manipulation modes is activated.

4. The system as described in claim 3 wherein said boundary is not visible on said screen.

5. The system as described in claim 4 wherein the size and shape of said boundary is adjustable.

6. In a computer system including a screen for displaying data, an I/O interface for interacting with said data on said display screen when said I/O interface is activated, and a movement indicator displayed on said screen for showing the movement of said I/O interface, a system for switching between data manipulation modes on said screen comprising:

a means for defining a bounding area in which a portion of said data is displayed;

said means also for defining a boundary defined within said bounding area;

a means for providing a position controlled mode of data manipulation within said bounding area;

a means for providing a rate controlled mode of data manipulation within said bounding area;

a means for switching between said rate controlled mode and said position controlled mode in response to the location of said movement indicator in relation to said bounding area and said boundary, wherein said switching means switches between said rate and said position controlled data manipulation modes independent of whether said I/O interface is activated or deactivated.

7. The system as described in claim 6 wherein said boundary is a closed rectilinear shape having an inside and an outside.

8. The system as described in claim 7 wherein when said movement indicator is in said inside of said boundary, said position controlled mode of data manipulation is activated and when said movement indicator is in said outside of said boundary, said rate controlled mode of data manipulation is activated.

9. The system as described in claim 8 wherein said means for providing said rate controlled mode of data manipulation further includes a means for providing a plurality of directional indicators, wherein when said movement indicator is on said outside of said boundary, said movement indicator becomes one of said plurality of directional indicators and wherein when said I/O device is activated said data is moved in the direction indicated by said one of said plurality of directional indicators.

10. The system as described in claim 9 wherein said bounding area is contiguous with a window within said display screen.

11. The system as described in claim 10 wherein the size and shape of said boundary is adjustable.

12. The system as described in claim 11 wherein said position and said rate controlled modes cause said data to be moved rotationally.

13. The system as described in claim 11 wherein said position and said rate controlled modes cause said data to be moved in a two-dimensional plane.

14. The system as described in claim 12 or 13 wherein said boundary is not visible on said screen.

15. In a computer system including a screen for displaying data, an I/O interface for interacting with said data on said display screen when said I/O interface is activated, and a movement indicator displayed on said screen for showing the movement of said I/O interface, a method for switching between data manipulation modes within said screen including the steps of:

defining a bounding area in which a portion of said data is displayed;

defining a boundary within said bounding area;

providing at least two modes of data manipulation;

switching between said at least two data manipulation modes depending on the location of said movement indicator in relation to said boundary and said bounding area, wherein switching between said at least two data manipulation modes occurs independent of whether said I/O interface is activated or deactivated.

16. The method as described in claim 15 wherein said boundary is a closed rectilinear shape having an inside and an outside.

17. The method as described in claim 16 wherein when said movement indicator is in said inside of said rectilinear shape said one of said at least two data manipulation modes is activated and when said movement indicator is on said outside of said rectilinear shape another of said at least two data manipulation modes is activated.

18. The method as described in claim 17 wherein said boundary is not visible on said screen.

19. The method as described in claim 18 wherein said boundary is adjustable.

20. In a computer system including a screen for displaying data, an I/O interface for interacting with said data on said display screen when said I/O interface is activated, and a movement indicator displayed on said screen for showing the movement of said I/O interface, a method for switching between data manipulation modes within said screen including the steps of:

defining a bounding area in which a portion of said data is displayed;

defining a closed boundary;

providing a position controlled mode of data manipulation;

providing a rate controlled mode of data manipulation;

switching between said position controlled and said rate controlled modes depending on the location of said movement indicator in relation to said boundary and said bounding area, wherein switching between said position controlled and said rate controlled modes occurs independent of whether said I/O interface is activated or inactivated.

21. The method as described in claim 20 wherein said boundary is a closed rectilinear shape having an inside and an outside.

22. The method as described in claim 21 wherein when said movement indicator is in said inside of said rectilinear shape said positioned controlled mode of said data manipulation is activated and when said movement indicator is on said outside of said rectilinear shape said rate controlled mode of data manipulation is activated.

23. The method as described in claim 22 wherein said step of providing said rate controlled mode of data manipulation further includes the step of providing at least one of a plurality of directional indicators when said movement indicator is on said outside of said boundary and said I/O interface is not activated, and wherein when said I/O device is activated said at least one of said plurality of directional indicators becomes highlighted and said data is moved in the direction indicated by said highlighted at least one of said plurality of directional indicators.

24. The method as described in claim 23 wherein said bounding area is contiguous with a window within said display screen.

25. The method as described in claim 24 wherein the size and shape of said boundary is adjustable.

26. The method as described in claim 25 wherein said position and said rate controlled modes cause said data to be moved rotationally.

27. The method as described in claim 25 wherein said position and said rate controlled modes cause said data to be moved in a two-dimensional plane.

28. The system as described in claims 26 or 27 wherein said boundary is not visible on said screen.

29. A system for controlling the display of data on a display device, comprising:

means for defining a window in which a portion of said data is displayed on said display device;

means defining a reference area within said window;

means for displaying a cursor which can be controlled by a user to manipulate data displayed in said window; and a display controller which is responsive to the position of said cursor for causing data to be manipulated in a first mode when said cursor is located within said reference area and for causing data to be manipulated in a second mode when said cursor is located outside of said reference area.

30. The system as described in claim 29 wherein said data is manipulated to show different portions within said window.

31. The system as described in claim 29 wherein said first mode a rate controlled manipulation mode and said second mode is a position controlled manipulation mode.

32. The system as described in claim 31 wherein when said displayed data is manipulated according to said first mode, said cursor becomes one of a plurality of directional indicators which indicates a direction of movement of said displayed data.

33. A method for controlling the display of data on a display device, comprising the steps of:

defining a window in which a portion of said data is displayed on said display device;

defining a reference area within said window;

displaying a cursor which can be controlled by a user to manipulate data displayed in said window;

causing data to be manipulated in a first mode when said cursor is located within said reference area; and causing data to be manipulated in a second mode when said cursor is located outside of said reference area.

34. The system as described in claim 33 wherein manipulating data causes different portions within said window to be shown.

35. The system as described in claim 33 wherein said first mode causes said data to be manipulated according to a rate controlled manipulation technique and said second mode causes said data to be manipulated according to a position controlled manipulation technique.

36. The system as described in claim 35 wherein manipulating said data in said first mode causes said cursor to become one of a plurality of directional indicators which indicates a direction of movement of said displayed data.

* * * * *